US012568393B2

(12) United States Patent
Srivastava et al.

(10) Patent No.: US 12,568,393 B2
(45) Date of Patent: Mar. 3, 2026

(54) METHODS, SYSTEMS, AND COMPUTER READABLE MEDIA FOR USING SERVICE COMMUNICATION PROXY (SCP) TO AUTOMATICALLY CONFIGURE SERVICE-BASED INTERFACE (SBI) TRANSACTION TIMEOUTS

(71) Applicant: Oracle International Corporation, Redwood Shores, CA (US)

(72) Inventors: Ankit Srivastava, Uttar Pradesh (IN); Anup Shivarajapura, Karnataka (IN); Saurabh Thukral, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 325 days.

(21) Appl. No.: 18/236,377

(22) Filed: Aug. 21, 2023

(65) Prior Publication Data

US 2025/0071598 A1 Feb. 27, 2025

(51) Int. Cl.
*H04W 28/02* (2009.01)
*H04L 43/04* (2022.01)
(Continued)

(52) U.S. Cl.
CPC ......... *H04W 28/0236* (2013.01); *H04L 43/04* (2013.01); *H04L 43/0858* (2013.01); *H04W 24/02* (2013.01)

(58) Field of Classification Search
CPC .. H04W 28/0236; H04W 24/02; H04L 43/04; H04L 43/0858; H04L 41/0895;
(Continued)

(56) References Cited

U.S. PATENT DOCUMENTS

| | | | | |
|---|---|---|---|---|
| 2022/0417783 A1* | 12/2022 | Srivastava | ........ | H04W 28/0231 |
| 2023/0022955 A1* | 1/2023 | Rajput | .................... | H04L 47/12 |

(Continued)

FOREIGN PATENT DOCUMENTS

KR 20220055259 A 5/2022

OTHER PUBLICATIONS

3rd Generation Partnership Project; Technical Specification Group Core Network and Terminals; 5G System; Network Function Repository Services; Stage 3 (Release 18) 3GPP TS 29.510 V18.1.0 (Dec. 2022).

(Continued)

*Primary Examiner* — Abdullahi E Salad
(74) *Attorney, Agent, or Firm* — Jenkins, Taylor & Hunt, P.A.

(57) ABSTRACT

A method for automatically configuring service-based interface (SBI) timeouts includes determining, by a service communication proxy (SCP), latency measurements for SBI interfaces with producer network functions (NFs). The method further includes maintaining, by the SCP, a database of the latency measurements for the SBI interfaces with the producer NFs. The method further includes communicating, by the SCP, the latency measurements to an element management system (EMS) for automatically configuring, at consumer NFs, timeouts for the SBI interfaces associated with the producer NFs.

18 Claims, 7 Drawing Sheets

(51) Int. Cl.
  *H04L 43/0852*    (2022.01)
  *H04W 24/02*    (2009.01)
(58) Field of Classification Search
  CPC ............... H04L 41/342; H04L 43/0852; H04L
            43/0864; H04L 69/28; H04L 41/0806
  See application file for complete search history.

(56)              References Cited

U.S. PATENT DOCUMENTS

| | | | | |
|---|---|---|---|---|
| 2023/0065199 | A1* | 3/2023 | Khare .................. | H04W 24/02 |
| 2024/0250989 | A1* | 7/2024 | Rajput ................... | H04L 63/20 |

OTHER PUBLICATIONS

Oracle® Communications Service Communication Proxy (SCP) Cloud Native User's Guide, Release 1.4, Jan. 2020.
Oracle® Communications Cloud Native Core Console User's Guide, Release 1.3.0, Sep. 2020.
Notification of Transmittal of the International Search Report and the Written Opinion of the International Searching Authority, or the Declaration for International Patent Application No. PCT/US2024/042977 (Nov. 25. 2024).

\* cited by examiner

1. POST .../custom_latencyinfo/latencyinfoSubscription 2. 201 Created (latencyinfoSubscription)

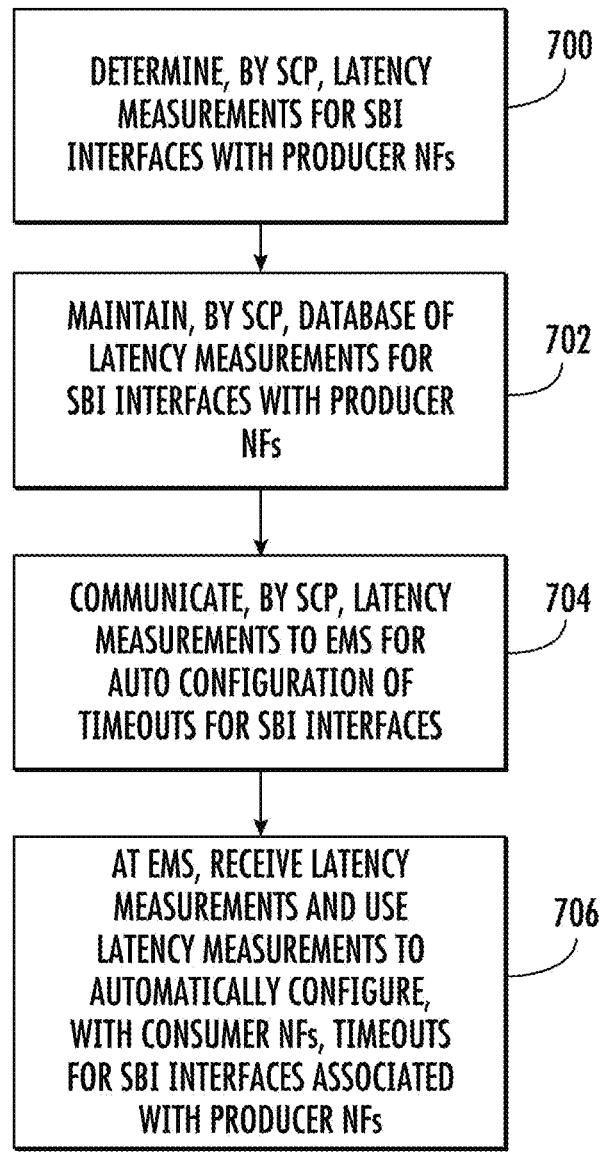

DETERMINE, BY SCP, LATENCY MEASUREMENTS FOR SBI INTERFACES WITH PRODUCER NFs — 700

MAINTAIN, BY SCP, DATABASE OF LATENCY MEASUREMENTS FOR SBI INTERFACES WITH PRODUCER NFs — 702

COMMUNICATE, BY SCP, LATENCY MEASUREMENTS TO EMS FOR AUTO CONFIGURATION OF TIMEOUTS FOR SBI INTERFACES — 704

AT EMS, RECEIVE LATENCY MEASUREMENTS AND USE LATENCY MEASUREMENTS TO AUTOMATICALLY CONFIGURE, WITH CONSUMER NFs, TIMEOUTS FOR SBI INTERFACES ASSOCIATED WITH PRODUCER NFs — 706

FIG. 7

METHODS, SYSTEMS, AND COMPUTER READABLE MEDIA FOR USING SERVICE COMMUNICATION PROXY (SCP) TO AUTOMATICALLY CONFIGURE SERVICE-BASED INTERFACE (SBI) TRANSACTION TIMEOUTS

TECHNICAL FIELD

The subject matter described herein relates to managing communications between 5G network functions. More particularly, the subject matter described herein relates to automatically configuring timeouts for SBI transactions between 5G NFs.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that exists in 5G and other types of networks is that latency varies for SBI transactions between 5G NFs, and there is no standardized way to automate timeout configurations for the transactions. The service based interface or SBI is the interface through which 5G consumer NFs request and receive service from 5G producer NFs by sending messages to the producer NFs and receiving responses from the producer NFs. When a 5G consumer NF sends a message to a 5G producer NF, the consumer NF expects a response within a timeout period. If the response is not received within the timeout period, the 5G consumer NF will consider the transaction as having failed and will take appropriate action, such as retransmitting the message or selecting another producer NF to provide the service. The value used to determine whether a timeout has occurred must be configured with the consumer NF. The timeout value needs to be long enough to account for normal network and processing delays to avoid classifying too many transactions as having failed. Configuring the timeout value is a difficult problem as response times for 5G transactions can vary based on network delay, transaction type, and loading of the 5G producer NF.

Currently, configuration of timeouts for 5G transactions is performed manually by a network operator through an element management system. Performing manual configuration of 5G transaction timeouts is inefficient in light of the number of 5G consumer NFs in the network, the different types of producer NFs for which the timeouts are configured, and variations in network and processing latency.

Accordingly, in light of these and other difficulties, there exists a need for improved methods, systems, and computer readable media for configuring timeouts for SBI transactions with producer NFs.

SUMMARY

A method for automatically configuring service-based interface (SBI) timeouts includes determining, by a service communication proxy (SCP), latency measurements for SBI interfaces with producer network functions (NFs). The method further includes maintaining, by the SCP, a database of the latency measurements for the SBI interfaces with the producer NFs. The method further includes communicating, by the SCP, the latency measurements to an element management system (EMS) for automatically configuring, with consumer NFs, timeouts for the SBI interfaces associated with the producer NFs.

According to another aspect of the subject matter described herein, determining the latency measurements includes routing SBI request messages to the producer NFs, receiving SBI response messages from the producer NFs and computing the latency measurements as differences between transmission times of the SBI request messages and receipt times of the SBI response messages.

According to another aspect of the subject matter described herein, determining the latency measurements includes determining the latency measurements on a per SBI interface basis and maintaining the database includes maintaining per-SBI-interface latency measurements in the database.

According to another aspect of the subject matter described herein, determining the latency measurements includes determining the latency measurements on a per-SBI-service basis and maintaining the database includes maintaining per-SBI-service latency measurements in the database.

According to another aspect of the subject matter described herein, maintaining the database includes maintaining minimum, maximum, and average latency values in the database.

According to another aspect of the subject matter described herein, communicating the latency measurements to the EMS comprises providing, by the SCP, a subscription interface for allowing the EMS to create a subscription for receiving notifications of the latency measurements and transmitting the notifications including the latency measurements to the EMS as part of the subscription.

According to another aspect of the subject matter described herein, providing the subscription interface includes providing a custom latency information subscription interface.

According to another aspect of the subject matter described herein, communicating the latency measurements to the EMS includes communicating the latency measurements to the EMS in response to query messages from the EMS.

According to another aspect of the subject matter described herein, the method for automatically configuring SBI timeouts includes, at the EMS, receiving the latency measurements and using the latency measurements to automatically configure, at the consumer NFs, the timeouts for the SBI interfaces associated with the producer NFs.

According to another aspect of the subject matter described herein, using the latency measurements to automatically configure, at the consumer NFs, timeouts for the SBI interfaces associated with the producer NFs includes transmitting representational state transfer (REST) application programming interface (API) messages to the consumer NFs instructing the consumer NFs to update the timeouts for the SBI interfaces associated with the producer NFs.

According to another aspect of the subject matter described herein, a system for automatically configuring service-based interface (SBI) timeouts is provided. The system includes a service communication proxy including at least one processor and a memory. The system further includes an SBI latency information tracker/communicator executed by the at least one processor for determining latency measurements for SBI interfaces with producer network functions (NFs), maintaining, in the memory, a database of the latency measurements for the SBI interfaces with the producer NFs; and communicating, by the SCP, the latency measurements to an element management system (EMS) for automatically configuring, at consumer NFs, timeouts for the SBI interfaces associated with the producer NFs.

According to another aspect of the subject matter described herein, the SBI latency information tracker/communicator is configured to determine the latency measurements by routing SBI request messages to the producer NFs, receiving SBI response messages from the producer NFs and computing the latency measurements as differences between transmission times of the SBI request messages and receipt times of the SBI response messages.

According to another aspect of the subject matter described herein, the SBI latency information tracker/communicator is configured to determine the latency measurements on a per SBI interface basis and to maintain per-SBI-interface latency measurements in the database.

According to another aspect of the subject matter described herein, the SBI latency information tracker/communicator is configured to determine the latency measurements on a per-SBI-service basis and to maintain per-SBI-service latency measurements in the database.

According to another aspect of the subject matter described herein, the SBI latency information tracker/communicator is configured to maintain minimum, maximum, and average latency values in the database.

According to another aspect of the subject matter described herein, the SBI latency information tracker/communicator is configured to communicate the latency measurements to the EMS by providing a subscription interface for allowing the EMS to create a subscription for receiving notifications of the latency measurements and transmitting the notifications including the latency measurements to the EMS as part of the subscription.

According to another aspect of the subject matter described herein, the subscription interface comprises a custom latency information subscription interface.

According to another aspect of the subject matter described herein, the SBI latency information tracker/communicator is configured to communicate the latency measurements to the EMS in response to query messages from the EMS.

According to another aspect of the subject matter described herein, the system includes the EMS, and the EMS is configured to receive the latency measurements and use the latency measurements to automatically configure, at the consumer NFs, the timeouts for the SBI interfaces associated with the producer NFs.

According to another aspect of the subject matter described herein, a non-transitory computer readable medium having stored thereon executable instructions that when executed by a processor of a computer control the computer to perform steps is provided. The steps include determining, by a service communication proxy (SCP), latency measurements for service-based interface (SBI) interfaces with producer network functions (NFs). The steps further include maintaining, by the SCP, a database of the latency measurements for the SBI interfaces with the producer NFs. The steps further include communicating, by the SCP, the latency measurements to an element management system (EMS) for automatically configuring, at consumer NFs, timeouts for the SBI interfaces associated with the producer NFs.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 7 is a flow chart illustrating an exemplary process performed by an SCP and an EMS for dynamic and automatic configuration of SBI interface transaction timeouts.

DETAILED DESCRIPTION

Figure 1:
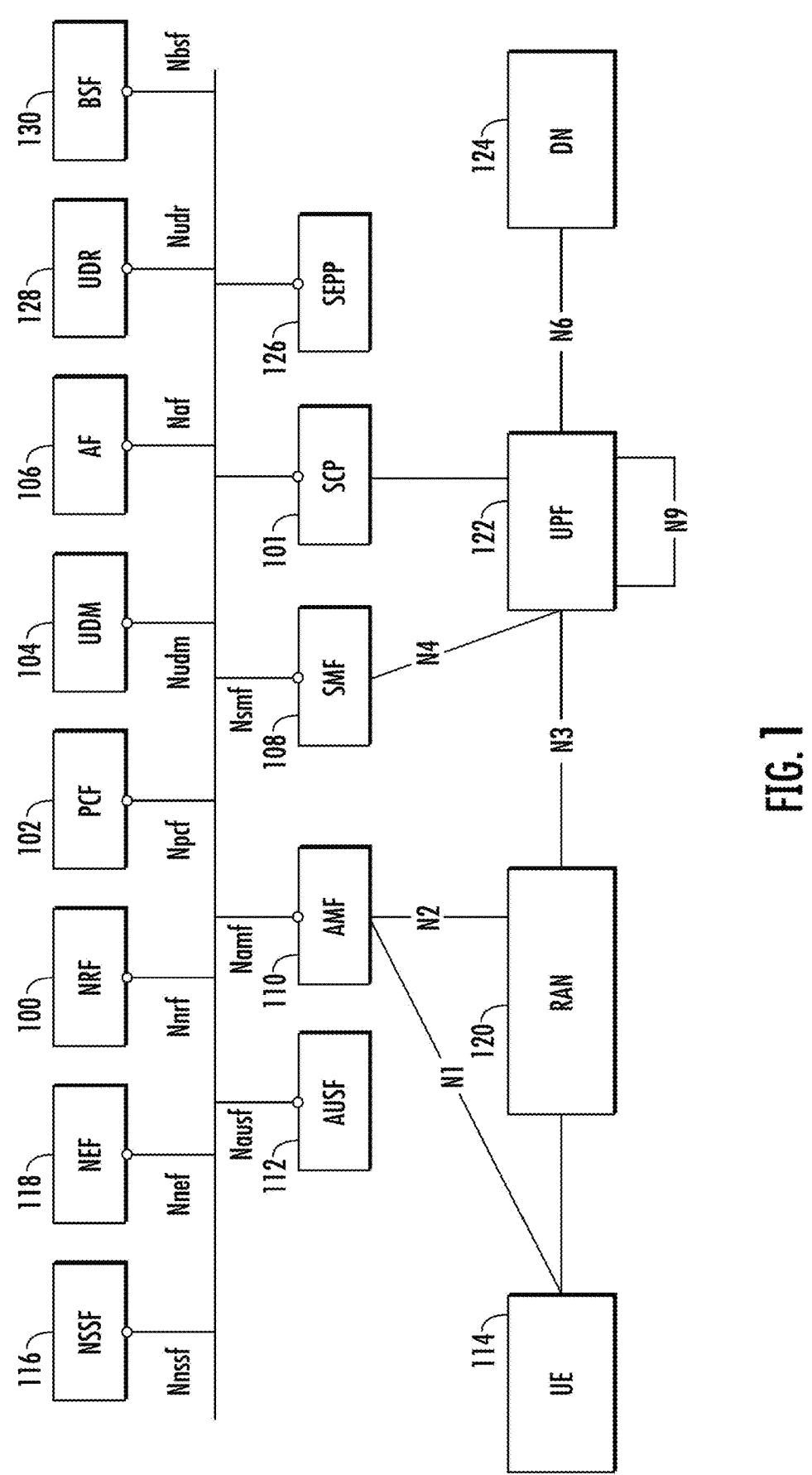
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As described above, one problem with 5G and other types of networks is the configuration of timeouts for transactions between network functions. 3GPP has standardized the 5G SBI interfaces and NF services, but there is no guidance on the method to determine the timeout values for SBI interfaces, as the timeout values can depend on the network infrastructure. More specifically, timeout values for SBI interfaces can depend on multiple factors, including:

1. Network dynamic characteristics (latency, congestion), which can change throughout the day;
2. Peer processing complexity; and
3. SBI operation type (some operations are processed by the peer itself and some require a lookup into another node, such as the UDR or the SLF).

Because of the above-described reasons, timeout configuration is a complex and labor-intensive exercise for network operators, and timeout configuration remains a static and manual process. The lack of dynamic adaptation of timeout values for SBI interfaces negatively impacts network end-to-end call processing latency and network efficiency. The 5G core needs to automate and dynamically adapt SBI interface timeout configuration in the network.

Figure 2:
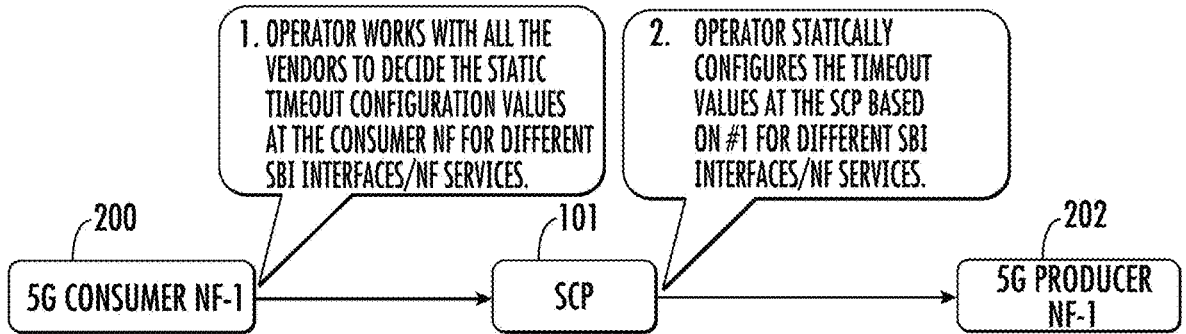
FIG. 2 is a network diagram illustrating static and manual configuration of SBI transaction timeouts.

FIG. 2 is a network diagram illustrating static and manual configuration of SBI transaction timeouts. Referring to FIG. 2, a 5G consumer NF 200 communicates with a 5G producer NF 202 via SCP 101. The network operator configures SBI transaction timeout values at consumer NF 200 for SBI transactions with different producer NFs, such as producer NF 202. The network operator also statically configures timeout values at SCP 101 based on different SBI interfaces and NF services. The management of static configuration of SBI transaction timeout values is a labor-intensive and complex operation due to the dynamic nature of the 5G network. Changes in timeout values must be manually configured by the network operator across all NF instances in the network.

The subject matter described herein automates SBI interface/NF service level timeout configuration. 3GPP has defined the NF-NF indirect communication mode where SCP is in the routing path of SBI interface traffic between consumer NFs and producer NFs. Because the SCP is in the routing path of SBI interface communications between NFs, the SCP can track and report runtime latency patterns of SBI interfaces/NF services in the network. The SCP described herein tracks and maintains latency patterns/measurements per SBI interface and per NF service. Using the tracked latency patterns or measurements, the SCP triggers automatic configuration of timeout values at consumer NFs by transmitting the latency patterns or measurements to an EMS, which automatically configures the SBI interface and service level timeouts at the consumer NFs according to the tracked latency patterns or measurements. Automatic configuration of the timeout values at the consumer NFs enables more accurate and rapid determination of SBI transaction timeouts. To communicate the latency patterns or measurements to the EMS, the SCP provides a custom NF service (Custom_LatencyInfo), which exposes an API through which the EMS can subscribe with the SCP for latency pattern information at the NF interface and/or NF service level. When the EMS receives the latency information via the subscription interface, the EMS can change the timeout configurations of consumer NFs that communicate with the producer NFs whose latency information is being tracked. Thus, the SCP and EMS described herein automatically and dynamically manage SBI interface timeouts used by consumer NFs to detect timeout events for transactions with producer NFs.

Figure 3:
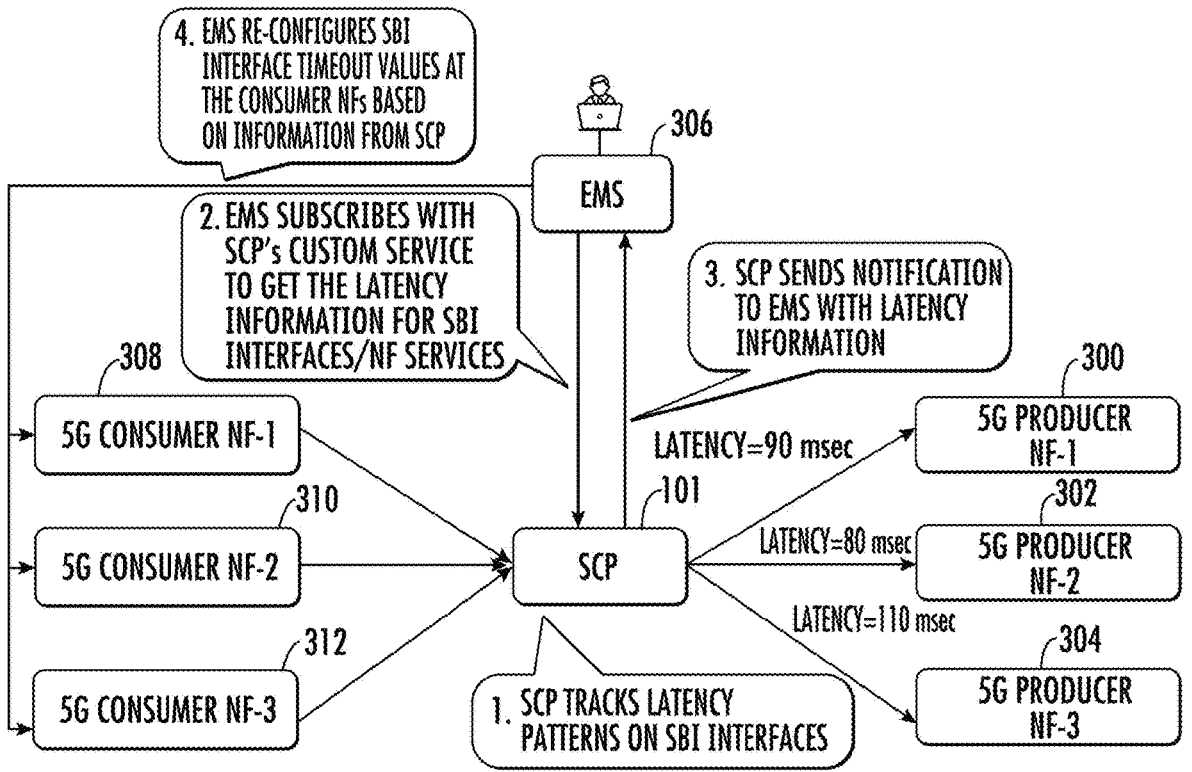
FIG. 3 is a network diagram illustrating dynamic and automatic configuration of SBI transaction timeouts.

FIG. 3 is a network diagram illustrating dynamic and automatic configuration of SBI transaction timeouts. Referring to FIG. 3, SCP 101 tracks latency on SBI interfaces with producer NFs 300, 302, and 304. EMS 306 subscribes with SCP 101 to receive notification of latency information for SBI interfaces and/or NF services. SCP 101 sends the notifications with the latency information to EMS 306. EMS 306 uses the latency information to automatically configure timeouts for SBI transactions with consumer NFs 308, 310, and 312.

To determine the latency information on the SBI interfaces, SCP 101 may record the transmission times of SBI request messages to producer NFs 300, 302, and 304 and record the latency as the time difference between the transmission of an SBI request message and the receipt of a corresponding response message. For example, if SCP 101 routes an SBI request message to producer NF 300 at time T1 and receives a response at time T2, the latency of the transaction is determined to be T2 minus T1, which includes both the network delay and the processing delay by producer NF 300. SCP 101 may monitor latency on a per interface basis and a per service basis. For example, if producer NF 300 is a UDM function, monitoring latency on a per service basis may include monitoring latency for the Nudm_uecm service or other service provided by the UDM. Continuing with the UDM example, monitoring latency on a per-interface basis may include monitoring latency on the Nudm interface with the particular UDM.

SCP 101 may also maintain a database of measurements of latency for SBI interfaces and services. It should also be noted that consumer NFs 308, 310, and 312 may track latency on the SBI interfaces with SCP 101 and use those latencies to dynamically adjust their SBI interface timeout values. For example, if the latency on the interface between consumer NF 308 and SCP 101 is L1 and the latency on the interface between SCP 101 and producer NF 300 is L2, consumer NF 308 may set the response timeout for the interface with producer NF 300 to be equal to L1+L2 or other measure or value based on L1 and L2.

Figure 4:
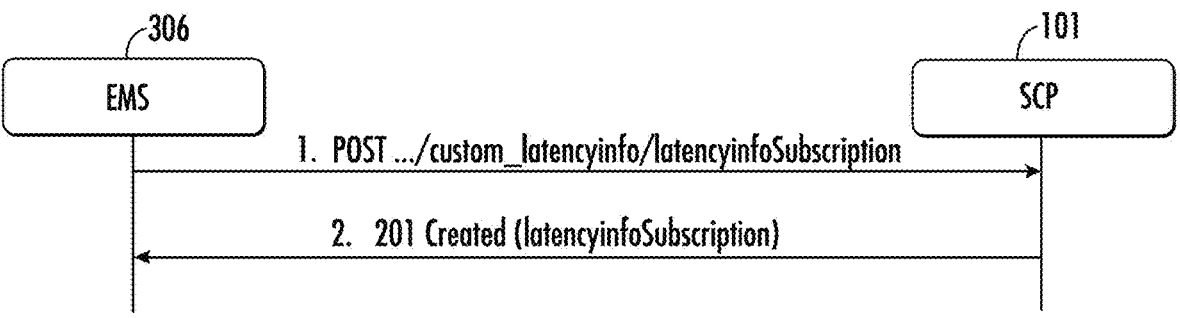
FIG. 4 is a message flow diagram illustrating exemplary messages exchanged between an EMS and an SCP for creating a subscription to receive SBI transaction latency information from the SCP.

As stated above, in one example, SCP 101 communicates SBI transaction latency to EMS 306 by providing an API that allows EMS 306 to subscribe to receive notification of latency information from SCP 101. FIG. 4 is a message flow diagram illustrating exemplary messages exchanged between EMS 306 and SCP 101 for creating a subscription to receive SBI transaction latency information from SCP 101. Referring to FIG. 4, in line 1 of the message flow diagram, EMS 306 sends an HTTP POST message to SCP 101. The HTTP POST message includes the custom latency information attribute and requests that EMS 306 be subscribed to notifications of latency information regarding SBI interfaces or services accessible via SCP 101. SCP 101 receives the HTTP POST message and creates the subscription. In line 2, SCP 101 sends a 201 Created message to EMS 306 confirming creation of the subscription.

Figure 5:
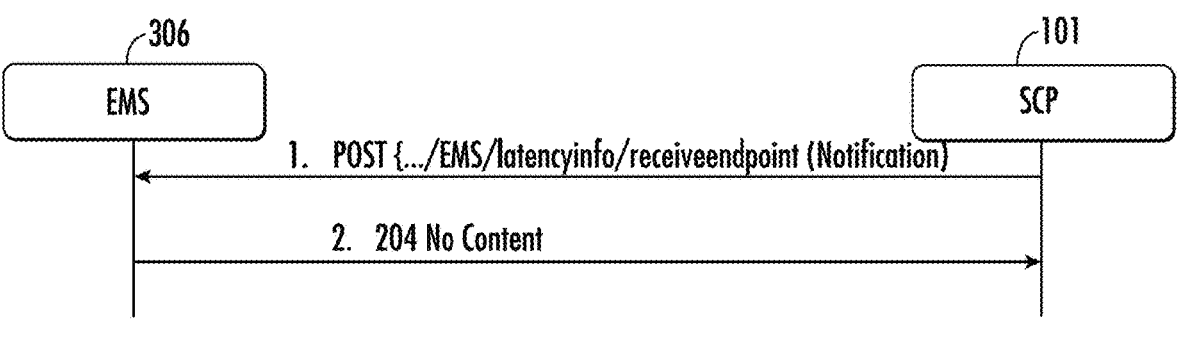
FIG. 5 is a message flow diagram illustrating exemplary messages exchanged between an EMS and an SCP notifying the EMS of SBI transaction latency information based on a subscription created with the SCP.

FIG. 5 is a message flow diagram illustrating exemplary messages exchanged between an EMS and an SCP notifying the EMS of SBI transaction latency information based on a subscription created with the SCP. Referring to FIG. 5, in line 1, SCP 101 sends an HTTP POST message to EMS 306. The HTTP POST message includes latency information corresponding to the previously created subscription. For example, if EMS 306 subscribes to receive latency information regarding a particular SBI interface or service, the latency information may be latency stored by SCP 101 for that interface or service. In line 2 of the message flow diagram, EMS 306 responds to the HTTP POST message with a 204 No Content message.

As stated above, SCP 101 may track latency at the SBI interface and/or SBI service level. Tables 1 and 2 shown below illustrate exemplary latency information that may be tracked and stored by SCP 101 in a latency information database maintained by SCP 101.

TABLE 1

| Per-Interface Latency Measurements Tracked and Stored by SCP | | | | |
|---|---|---|---|---|
| SBI Interface | Max Latency (milliseconds) | Min Latency (milliseconds) | Median Latency (milliseconds) | Mean Latency (milliseconds) |
| N7 | 120 | 70 | 80 | 90 |
| N8 | 110 | 60 | 70 | 80 |
| N10 | 150 | 90 | 100 | 110 |
| N12 | 250 | 150 | 170 | 180 |

TABLE 2

| Per-Service Latency Measurements Tracked and Stored by SCP | | | | |
|---|---|---|---|---|
| SBI Interface | Max Latency (milliseconds) | Min Latency (milliseconds) | Median Latency (milliseconds) | Mean Latency (milliseconds) |
| Nudm_uecm | 120 | 70 | 80 | 90 |
| Nsmf_pdusession | 110 | 60 | 70 | 80 |
| Nudm_sd | 150 | 90 | 100 | 110 |
| Npcf_smpolicy | 250 | 150 | 170 | 180 |

In Table 1, SCP 101 tracks and stores minimum latency, maximum latency, median latency, and mean latency values for SBI interfaces N7, N8, N10, and N12. In Table 2, SCP 101 tracks and stores latency information for SBI services, such as Nudm_uecm service, Nsmf_pdusession service, Nudm_sd service, and Npcf_smpolicy service. It should be noted that the services and interfaces illustrated in Tables 1 and 2 are shown for illustrative purposes only and that SCP 101 may track and store latency information for other interfaces and/or services in addition to or instead of those shown in Tables 1 and 2 without departing from the scope of the subject matter described herein.

SCP 101 may communicate all or a subset of the information in Tables 1 and 2 to EMS 101. EMS 101 may utilize the receipt of the latency information as a trigger for sending a command to consumer NFs to automatically configure or reconfigure SBI interface or transaction timeouts used by consumer NFs.

Figure 6:
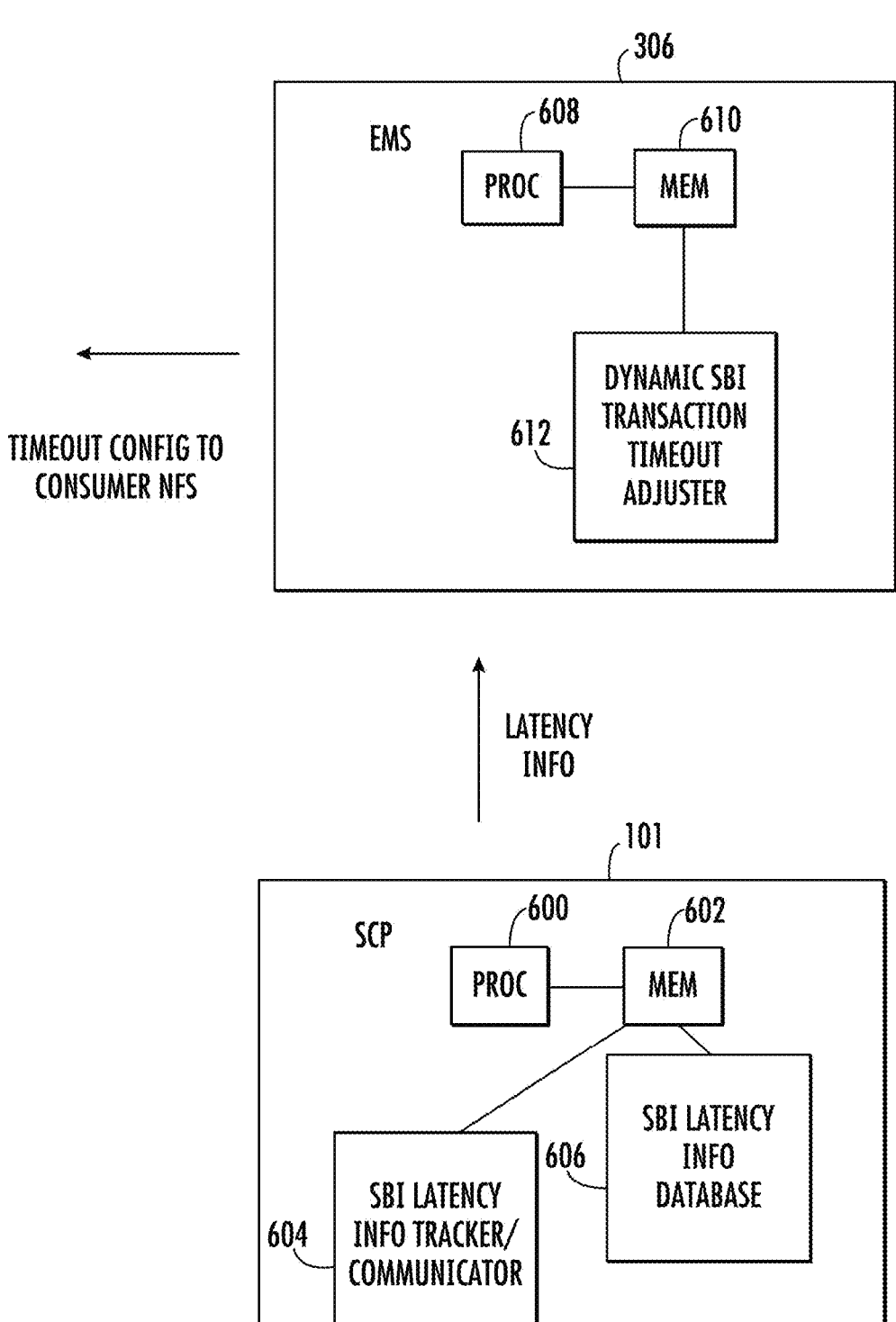
FIG. 6 is a block diagram illustrating an exemplary architecture for an SCP and an EMS for performing dynamic an automatic configuration of SBI interface transaction timeouts.

FIG. 6 is a block diagram illustrating an exemplary architecture for an SCP and an EMS for performing dynamic an automatic configuration of SBI interface transaction timeouts. Referring to FIG. 6, SCP 101 includes at least one processor 600 and memory 602. SCP 101 further includes an SBI latency information tracker/communicator 604 that tracks latency of SBI transactions at an interface and/or service level and communicates the latency information to EMS 306. SCP 101 further includes an SBI latency information database 606 that stores the tracked latency measurements. SBI latency information tracker/communicator 604 may be implemented using computer executable instructions stored in memory 602 and executed by processor 600.

EMS 306 includes at least one processor 608 and memory 610. EMS 306 further includes a dynamic SBI transaction timeout adjuster 612 that subscribes to and receives latency information from SCP 101 and sends commands to consumer NFs to automatically configure SBI transaction timeouts based on the received latency information. The commands may be transmitted in a format recognized by the consumer NFs for timeout configuration. In one example, the format is REST. It should be noted that the timeouts may include some or all of the latency information in Tables 1 and 2. The consumer NFs may receive the commands including the latency information and update their transaction timeouts for SBI interfaces and NF services based on the received latency information. Dynamic SBI transaction timeout adjuster 612 may be implemented using computer executable instructions stored in memory 610 and executed by processor 608.

FIG. 7 is a flow chart illustrating an exemplary process performed by an SCP and an EMS for dynamic and automatic configuration of SBI interface transaction timeouts. Referring to FIG. 7, in step 700, the process includes determining, by the SCP, latency measurements for SBI interfaces with producer NFs. For example, SCP 101 may track latency information associated with transactions involving producer NFs by routing messages from consumer NFs to producer NFs, receiving responses from the producer NFs, and computing the latency as a difference between transmission time of a request and receipt of a response from the producer NF.

In step 702, the process further includes maintaining, by the SCP, a database of the latency measurements for the SBI interfaces with the producer NFs. For example, SCP 101 may maintain a database of latency information associated with SBI interfaces whose latency is tracked by SCP 101. Tables 1 and 2 described above illustrate examples of the types of latency information that may be maintained, and the information may be maintained on a per-interface and/or per-service basis.

In step 704, the process further includes communicating, by the SCP, the latency measurements to an EMS for automatically configuring, at consumer NFs, timeouts for the SBI interfaces associated with the producer NFs. For example, SCP 101 may transmit notification messages to EMS 306 of updates in latency information associated with SBI interfaces between SCP 101 and producer NFs. The notification messages may be transmitted in response to a latency information subscription created by EMS 306 with SCP 101. In an alternate implementation, SCP 101 may communicate the latency information to EMS 306 in response to a query from EMS 306, i.e., without requiring a subscription.

In step 706, the process includes receiving, by the EMS, the latency measurements and using the latency measurements to automatically configure, with consumer NFs, SBI transaction timeouts associated with producer NFs. For example, EMS 306 may receive the latency measurements from SCP 101 and use the receipt of the latency measurements to trigger sending of commands to consumer NFs to automatically update their timeouts associated with SBI interfaces that the consumer NFs use to contact producer NFs. The commands may be formatted according to the configuration APIs of the consumer NFs. In one example, the API used to configure the timeouts of the consumer NFs may be a REST API.

Dynamic SBI interface timeout configuration management as described herein enables optimized end-to-end call processing latency, which, in turn, improves network efficiency. Dynamic SBI interface timeout configuration also enables an adaptable 5G core based on network latency and congestion throughout the day. Dynamic SBI interface timeout configuration relieves the network operator of the burden of managing complex timeout configuration for SBI interfaces. Dynamic SBI interface timeout configuration also enables faster alternate routing at the SCP based on the dynamic SBI interface latency instead of relying on static timeout values. This enables faster timeout handling in the 5G core.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.1.0 (2022 December)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically configuring service-based interface (SBI) timeouts, the method comprising:
    determining, by a service communication proxy (SCP), latency measurements for SBI interfaces with producer network functions (NFs);
    maintaining, by the SCP, a database of the latency measurements for the SBI interfaces with the producer NFs;
    communicating, by the SCP, the latency measurements to an element management system (EMS) for automatically configuring, at consumer NFs, timeouts used by the consumer NFs for the SBI interfaces associated with the producer NFs; and
    automatically configuring, by the EMS, the timeouts used by the consumer NFs for the SBI interfaces associated with the producer NFs, wherein the timeouts used by the consumer NFs for the SBI interfaces associated with the producer NFs indicate time periods that the consumer NFs will wait after transmitting requests on the SBI interfaces before considering SBI transactions as having failed.

2. The method of claim 1 wherein determining the latency measurements includes routing SBI request messages to the producer NFs, receiving SBI response messages from the producer NFs and computing the latency measurements as differences between transmission times of the SBI request messages and receipt times of the SBI response messages.

3. The method of claim 1 wherein determining the latency measurements includes determining the latency measurements on a per SBI interface basis and wherein maintaining the database includes maintaining per-SBI-interface latency measurements in the database.

4. The method of claim 1 wherein determining the latency measurements includes determining the latency measurements on a per-SBI-service basis and wherein maintaining the database includes maintaining per-SBI-service latency measurements in the database.

5. The method of claim 1 wherein maintaining the database includes maintaining minimum, maximum, and average latency values in the database.

6. The method of claim 1 wherein communicating the latency measurements to the EMS comprises providing, by the SCP, a subscription interface for allowing the EMS to create a subscription for receiving notifications of the latency measurements and transmitting the notifications including the latency measurements to the EMS as part of the subscription.

7. The method of claim 6 wherein providing the subscription interface includes providing a custom latency information subscription interface.

8. The method of claim 1 wherein communicating the latency measurements to the EMS includes communicating the latency measurements to the EMS in response to query messages from the EMS.

9. The method of claim 1 wherein using the latency measurements to automatically configure, at the consumer NFs, the timeouts used by the consumer NFs for the SBI interfaces associated with the producer NFs includes transmitting representational state transfer (REST) application programming interface (API) messages to the consumer NFs instructing the consumer NFs to update the timeouts used by the consumer NFs for the SBI interfaces associated with the producer NFs.

10. A system for automatically configuring service-b interface (SBI) timeouts, the system comprising:
  a service communication proxy including at least one processor and a memory;
  an SBI latency information tracker/communicator executed by the at least one processor for determining latency measurements for SBI interfaces with producer network functions (NFs), maintaining, in the memory, a database of the latency measurements for the SBI interfaces with the producer NFs; and communicating, by the SCP, the latency measurements for automatically configuring, at consumer NFs, timeouts used by the consumer NFs for the SBI interfaces associated with the producer NFs; and
  an element management system (EMS) for receiving the latency measurements from the SCP and for automatically configuring the timeouts used by the consumer NFs for the SBI interfaces associated with the producer NFs, wherein the timeouts used by the consumer NFs for the SBI interfaces associated with the producer NFs indicate time periods that the consumer NFs will wait after transmitting requests on the SBI interfaces before considering SBI transactions as having failed.

11. The system of claim 10 wherein the SBI latency information tracker/communicator is configured to determine the latency measurements by routing SBI request messages to the producer NFs, receiving SBI response messages from the producer NFs and computing the latency measurements as differences between transmission times of the SBI request messages and receipt times of the SBI response messages.

12. The system of claim 10 wherein the SBI latency information tracker/communicator is configured to determine the latency measurements on a per SBI interface basis and to maintain per-SBI-interface latency measurements in the database.

13. The system of claim 10 wherein the SBI latency information tracker/communicator is configured to determine the latency measurements on a per-SBI-service basis and to maintain per-SBI-service latency measurements in the database.

14. The system of claim 10 wherein the SBI latency information tracker/communicator is configured to maintain minimum, maximum, and average latency values in the database.

15. The system of claim 10 wherein the SBI latency information tracker/communicator is configured to communicate the latency measurements to the EMS by providing a subscription interface for allowing the EMS to create a subscription for receiving notifications of the latency measurements and transmitting the notifications including the latency measurements to the EMS as part of the subscription.

16. The system of claim 15 wherein the subscription interface comprises a custom latency information subscription interface.

17. The system of claim 10 wherein the SBI latency information tracker/communicator is configured to communicate the latency measurements to the EMS in response to query messages from the EMS.

18. A non-transitory computer readable medium having stored thereon executable instructions that when executed by a processor of a computer control the computer to perform steps comprising:
  determining, by a service communication proxy (SCP), latency measurements for service-based interface (SBI) interfaces with producer network functions (NFs);
  maintaining, by the SCP, a database of the latency measurements for the SBI interfaces with the producer NFs;
  communicating, by the SCP, the latency measurements to an element management system (EMS) for automatically configuring, at consumer NFs, timeouts used by the consumer NFs for the SBI interfaces associated with the producer NFs; and
  automatically configuring, by the EMS, the timeouts used by the consumer NFs for the SBI interfaces associated with the producer NFs, wherein the timeouts used by the consumer NFs for the SBI interfaces associated with the producer NFs indicate time periods that the consumer NFs will wait after transmitting requests on the SBI interfaces before considering SBI transactions as having failed.

* * * * *